United States Patent
Correia et al.

(10) Patent No.: US 6,570,127 B2
(45) Date of Patent: May 27, 2003

(54) SHIELDING GAS MIXTURE FOR MIG BRAZING

(75) Inventors: João Vinicíus de Oliveira Correia, Icaraí-Niterói-RJ (BR); Jeferson Frederico Monteiro Costa, Rio de Janeiro (BR)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/848,119

(22) Filed: May 3, 2001

(65) Prior Publication Data

US 2003/0019856 A1 Jan. 30, 2003

(51) Int. Cl.⁷ .............................. B23K 1/00; B23K 35/37
(52) U.S. Cl. .................... 219/129; 228/219; 252/373
(58) Field of Search ................ 217/74, 75, 121.84, 217/129; 252/373; 228/218, 219, 4

(56) References Cited

U.S. PATENT DOCUMENTS

| | | | |
|---|---|---|---|
| 4,072,845 A | * | 2/1978 | Buckingham et al. |
| 4,463,243 A | * | 7/1984 | Church |
| 4,527,038 A | * | 7/1985 | Cuny et al. |
| 4,623,524 A | * | 11/1986 | Someya et al. |
| 4,973,822 A | * | 11/1990 | Evans et al. |
| 5,210,388 A | | 5/1993 | Farwer |
| 5,313,039 A | * | 5/1994 | Harvey et al. |
| 5,367,137 A | * | 11/1994 | Hammarlund et al. |
| 6,060,678 A | * | 5/2000 | Allford |
| 6,069,336 A | * | 5/2000 | Borne et al. |
| 6,111,219 A | * | 8/2000 | Macedo et al. |
| 6,198,068 B1 | * | 3/2001 | Lindstrom |
| 6,274,838 B1 | * | 8/2001 | Demers et al. |
| 6,303,891 B1 | * | 10/2001 | Gault |
| 2002/0008094 A1 | * | 1/2002 | Briand et al. |
| 2002/0014473 A1 | * | 2/2002 | Nagashima et al. |

FOREIGN PATENT DOCUMENTS

| | | |
|---|---|---|
| EP | 0424545 A1 | 8/1991 |
| EP | 0502318 A1 * | 9/1992 |
| JP | 52068040 A * | 6/1997 |
| JP | 9248668 A2 | 9/1997 |
| JP | 2001321938 A * | 11/2001 |

OTHER PUBLICATIONS

Hackl "MIG Brazing of Galvanised Light–Guage Sheets", Fronius–Austria (No Date).
Davies "Precoated Steel in the Automotive Industry", MBM, May 1993, pp 62/67.
Dilthey et al., "GMA—Brazing of Galvanized and Alloyed Steels. An alternative Joining Technology in Vehicle Construction", IIW—Doc XII–1630–00 (No Date).
"Welding Galvanized Steel", TWI Connect—Jul. 1991 —No. 23, pp. 1–8.

* cited by examiner

Primary Examiner—Tom Dunn
Assistant Examiner—Kiley Stoner
(74) Attorney, Agent, or Firm—Robert J. Follett

(57) ABSTRACT

The shielding gas mixture is useful for MIG brazing galvanized steel. The gas mixture having by volume percent, about 0.5 to 4 carbon dioxide, about 0.2 to 1 hydrogen, and the balance is argon and incidental impurities.

11 Claims, No Drawings

SHIELDING GAS MIXTURE FOR MIG BRAZING

FIELD OF THE INVENTION

This invention is related to a gas mixture and method for metal inert gas (MIG) brazing.

BACKGROUND OF THE INVENTION

Presently, the performance of the existing shielding gases for MIG brazing of galvanized steels requires optimizing for each narrow coating layer thickness range. Whenever this thickness exceeds certain limits, poor arc stability occurs in the brazing process. This poor arc stability produces detrimental effects in the bead geometry and finishing, as well as produces a remarkable reduction in the corrosion resistance of the heat affected zone. Most often, the arc's instability originates from excessive amounts of zinc oxide formation in the arc's column.

At present, commercial gas mixtures rely upon oxygen additions to argon to stabilize the arc and thereby solve the problems of spatter generation. Unfortunately, oxygen detrimentally contributes to further zinc oxidation. Consequently, the oxygen damages the base metal coating layer, which affects the corrosion resistance of the joint. As discussed above, another limitation of these argon-oxygen mixtures is that the arc stability produced by the oxygen additions is restricted to a narrow coating thickness range.

Publications relating to shielding gas mixtures for MIG brazing include: Japan Patent No. JP9248668A2; WO Patent No. WO024545A1; H. Hackl, "MIG brazing of Galvanized Light-Gauge Sheet", Fronius, Austria; G. Davies, "Precoated Steel in the Automotive Industry", MBM, May/1993; U. Dilthey et all, "GMA-Brazing of Galvanized and Alloyed Steels. An Alternative Joining Technology in Vehicle Construction", IIW, doc XII. As far as known, none of these shielding gases produce excellent arc stability independent of a coating's thickness; reduce the damage to this coating layer; or maintain the corrosion resistance of the welded parts.

SUMMARY OF THE INVENTION

The shielding gas mixture is useful for MIG brazing galvanized steel. The gas mixture consists essentially of, by volume percent, about 0.5 to 4 carbon dioxide, about 0.2 to 1 hydrogen, and the balance is argon and incidental impurities. A MIG process uses this shielding gas to braze galvanized steels. First, an electric arc forms between a consumable copper-base alloy wire electrode and a workpiece. Then the shielding gas mixture shields the arc for MIG brazing the workpiece with the copper-base alloy wire. The shielding gas limits zinc oxidation of the galvanized steel and stabilizes the arc.

DETAILED DESCRIPTION OF THE INVENTION

An argon gas mixture containing carbon dioxide and hydrogen unexpectedly improves MIG brazing. The argon-base gas mixture achieves its performance through the carbon dioxide and hydrogen additions. During MIG brazing, dissociation and recombination of the carbon dioxide and hydrogen molecules in the arc zone generate heat and improve both bead finishing and geometry. In addition, hydrogen provides a reducing environment that decreases zinc oxidation, improves arc stability and maintains corrosion resistance. Furthermore, the improved arc stability generates less spatter, improves bead geometry and appearance, enhances mechanical properties and maintains corrosion resistance of the brazed joint for a wide thickness range of the base metal's coating layer. For purposes of this specification, MIG brazing includes: arc brazing processes having an electric arc established between a consumable copper-base alloy wire electrode and a workpiece; and continuously feeding the copper-base alloy wire to this arc as it moves with respect to a workpiece's joint.

The shielding gas mixture operates in all welding (brazing) positions, both for manual and automatic brazing in short circuit or pulsed spray transfer modes.

The arc and the molten wire are protected by a shielding gas from the contaminants of the atmosphere. This shielding gas, as provided in the present invention, contains, by volume percent, from about 0.5 to 4 volume percent carbon dioxide. This specification identifies all concentrations by volume percent, unless specifically referenced otherwise. Advantageously, the shielding gas contains about 1 to 3 volume percent carbon dioxide for heating purposes. Most advantageously, the shielding gas contains a nominal concentration of about 2 volume percent carbon dioxide. In addition, the shielding gas contains from about 0.2 to 1 percent hydrogen to prevent zinc oxidation and to stabilize the arc. Advantageously, the stabilizing gas contains about 0.25 to 0.75 volume percent hydrogen; and most advantageously contains a nominal concentration of about 0.5 percent hydrogen. The balance of the stabilizing gas is argon and incidental impurities.

The stabilizing gas is most effective for hot dip galvanized steel and copper-base filler metals. This gas has proved particularly effective for copper-base alloys such as, AWS A5.7 ERCuSi-A (having a nominal composition of 94% Cu+0.6% Sn+0.3% Fe+0.8% Mn+3.3% Si+0.6% Zn) and 97% Cu+0.2% Sn+0.2% Fe+0.8% Mn+1.3% Si, by weight percent.

EXAMPLE

Three different thickness for lap joints, different brazing positions and metal transfer modes were adopted for the experimental procedure.

The lab tests were carried out both in manual and automatic brazing with a model SOLMIG 200 STAR welder manufactured by C.E.A. Electromeccaniche Annettoni S.p.A.

An extensive analysis of pure argon and argon/oxygen mixtures was carried out to investigate arc stability, weld pool control, bead geometry and appearance, extension of coating damage and parameters range.

After this initial phase, some new tentative compositions were tested using the same criteria.

Table 1 shows the optimized parameters used for qualification of brazing procedures with the new shielding gas mixture.

Table 1—Optimized parameters used for qualification of brazing procedures, where diameter of filler wire used was 0.030" (0.076 cm).

| Filler Metal | Plate Thickness (mm) | Arc Current (A) | Arc Voltage (V) | Brazing Speed (cm/min.) | Heat Imput (J/mm) |
|---|---|---|---|---|---|
| AWS A5.7 ERCuSi-A | 0.65 | 85 | 13.3 | 34.5 | 0.196 |
| | 0.95 | 92 | 15.1 | 41.2 | 0.202 |
| | 1.25 | 129 | 17.8 | 50.0 | 0.276 |
| 97% Cu + 0.2% Sn + 0.2% Fe + 0.8% Mn + 1.3% Si | 0.65 | 65 | 14.1 | 49.3 | 0.112 |
| | 0.95 | 103 | 14.6 | 55.7 | 0.162 |
| | 1.25 | 125 | 14.8 | 56.7 | 0.196 |

After the brazing tests, the samples were evaluated as follows: a) mechanical testing for qualification of brazing procedures based on ANSI/AWS B2.2-91—Standard for Brazing Procedures and Performance Qualification, AWS D1.3-89—Structural Welding Code—Sheet Steel and Technical Standards Brazilian Association (ABNT)—NBR 7008/1994—Hot Dip Galvanized Steel Sheets; and b) Metallurgical characteristics (macro and microstructural analysis).

Table 2 shows the results of tensile tests obtained for the brazed joints and base metal, as compared to standards MIG welding specifications.

Table 2—Tensile tests results for brazed joints and base metal, where the minimum value for the tensile strength according to NBR7008/1994 is at least 315 MPa.

| Metal Transfer | Filler Metal | Plate Thickness (mm) | Tensile Strength (MPa) | Rupture Location |
|---|---|---|---|---|
| Short Circuit | AWS A5.7 ERCuSi-A | 0.65 | 355 | Base Metal |
| | | 0.95 | 378 | Base Metal |
| | | 1.25 | 372 | Base Metal |
| | 97% Cu + 0.2% Sn + 0.2% Fe + 0.8% Mn + 1.3% Si | 0.65 | 378 | Base Metal |
| | | 0.95 | 378 | Base Metal |
| | | 1.25 | 370 | Base Metal |
| Pulsed Spray | 97% Cu + 0.2% Sn + 0.2% Fe + 0.8% Mn + 1.3% Si | 0.95 | 379 | Base Metal |
| | Base Metal | 0.65 | 364 | |
| | | 0.95 | 347 | |
| | | 1.25 | 338 | |

The results found in macro and microstructural analysis of the brazed joints showed: 1) beads with uniform macroscopic appearance; 2) very little damage to the base metal coating layer; 3) adequate bead profile for cyclic loading (good fatigue resistance); 4) virtually no base metal fusion; and 5) no porosities.

According to the test results, it is possible to conclude that hydrogen additions limited to 1 percent promoted a reducing atmosphere in the fusion zone, to decrease zinc oxide formation and decrease damage to the coating layer; and provided excellent arc stability. The more stable arc allowed the use of the MIG brazing process to plate thickness of less than about 5 mm and as low as 0.65 mm with excellent results.

The combining effect of carbon dioxide and hydrogen, promotes the excellent bead geometry and consequently, very good mechanical properties. The shielding gas improves performance for MIG brazing of thin sheet galvanized steels with increased coating thickness. In addition, the shielding gas decreases damage to the zinc coating to extend the use of the process to lower plate thickness and to maintain corrosion resistance.

Specific features of the invention are described one or more embodiment for convenience only, as each feature may be combined with other features in accordance with the invention. Alternative embodiments will be recognized by those skilled in the art and are intended to be included within the scope of the claims.

What is claimed is:

1. A shielding gas mixture useful for MIG brazing galvanized steel, the gas mixture consisting of, by volume percent, about 0.5 to 4 carbon dioxide, about 0.2 to 1 hydrogen and the balance being argon.

2. The gas mixture of claim 1 wherein the gas mixture contains, by volume percent, about 1 to 3 carbon dioxide.

3. The gas mixture of claim 1 wherein the gas mixture contains, by volume percent, about 0.25 to 0.75 hydrogen.

4. A shielding gas mixture useful for MIG brazing galvanized steel, the gas mixture consisting of, by volume percent, about 1 to 3 carbon dioxide, about 0.2 to 1 hydrogen and the balance being argon.

5. The gas mixture of claim 4 wherein the gas mixture contains, by volume percent, about 2 carbon dioxide.

6. The gas mixture of claim 4 wherein the gas mixture contains, by volume percent, about 0.5 hydrogen.

7. The gas mixture of claim 4 wherein the mixture contains, by volume percent, about 2 carbon dioxide and about 0.5 hydrogen.

8. A metal inert gas (MIG) process for brazing of galvanized steels comprising the steps of:

a) forming an electric arc between a consumable copper-base alloy wire electrode and a workpiece;

b) shielding the arc with a shielding gas mixture, the shielding gas mixture consisting essentially of, by volume percent, about 0.5 to 4 carbon dioxide; about 0.2 to 1 hydrogen; and the balance being argon and incidental impurities; and c) MIG brazing the workpiece with the copper-base alloy wire under the shielding gas to limit zinc oxidation of the galvanized steel and to stabilize the arc.

9. The process of claim 8 wherein the brazing occurs on a galvanized steel plate having a thickness of less than about 5 mm.

10. The process of claim 8 wherein the copper-base alloy is selected from the group consisting of AWS A5.7 ERCuSi-A and 97 Cu, 0.2 Sn, 0.2 Fe, 0.8 Mn and 1.3 Si, by weight percent.

11. The process of claim 8 wherein the shielding occurs with the shielding gas mixture consisting essentially of, by volume percent, about 1 to 3 carbon dioxide, about 0.25 to 0.75 hydrogen and balance argon and incidental impurities.

* * * * *